Figure 1:
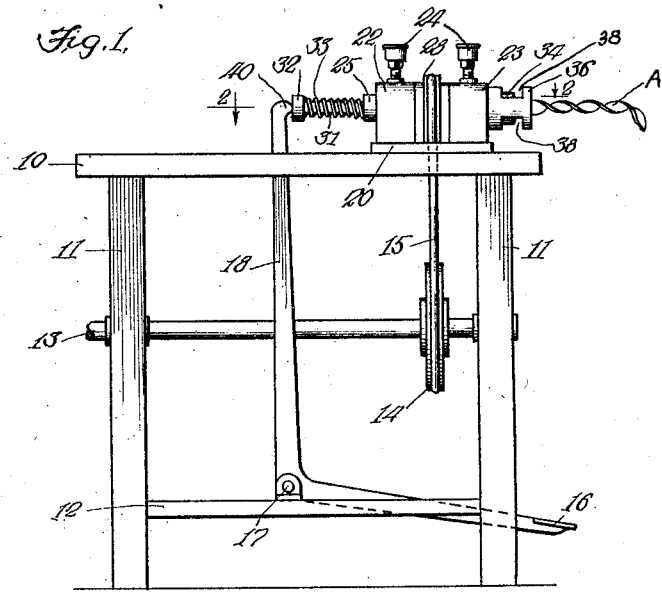

W. E. OLSON.
TWISTER FOR CARPET STRIPS AND THE LIKE.
APPLICATION FILED JULY 8, 1920.

1,406,217.

Patented Feb. 14, 1922.

Inventor:
Walter E. Olson,
By Jones, Addington, Ames & Seibold
Attys.

UNITED STATES PATENT OFFICE.

WALTER E. OLSON, OF CHICAGO, ILLINOIS.

TWISTER FOR CARPET STRIPS AND THE LIKE.

1,406,217. Specification of Letters Patent. Patented Feb. 14, 1922.

Application filed July 8, 1920. Serial No. 394,653.

*To all whom it may concern:*

Be it known that I, WALTER E. OLSON, a citizen of the United States, residing at Chicago, in the county of Cook and State of Illinois, have invented new and useful Improvements in Twisters for Carpet Strips and the like, of which the following is a full, clear, concise, and exact description, reference being had to the accompanying drawing, forming a part of this specification.

This invention relates to twisting machines of the type capable of use in the twisting of strips of material used in the making of reversible rugs.

One object of this invention is to provide an improved twisting device which may be easily and speedily operated to completely twist the article clamped therein.

Another object is to provide a twisting machine having improved clamping means for holding the article to be twisted.

Other objects will appear from the detailed description following and the accompanying drawings and appended claims.

In the drawings—

Figure 2:
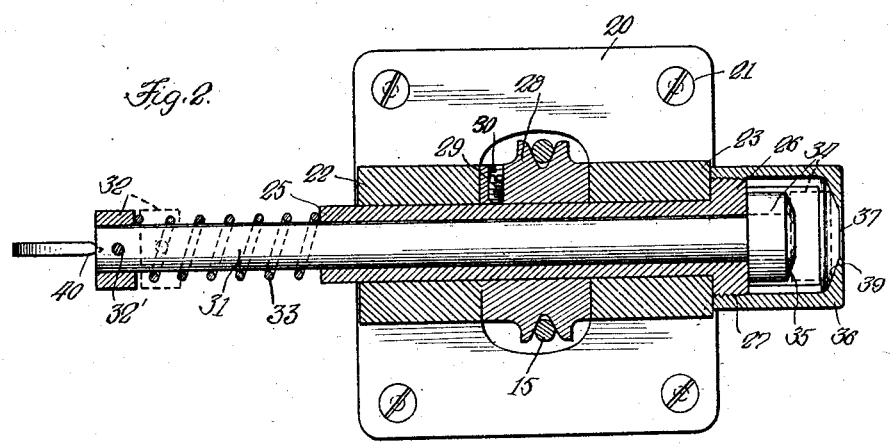

Fig. 1 is a side elevation of the twister mounted on a suitable table therefor; and Fig. 2 is an enlarged horizontal longitudinal section taken on the line 2—2 of Fig. 1.

The twister shown herein is suitably mounted on a table 10 comprising supporting legs 11 which are braced at each side near their lower ends by a member 12. Suitably mounted in bearings supported by said table is a line shaft 13 for driving the twister. Other suitable driving means, however, could be used. Mounted on said line shaft and rotatable therewith is a pulley 14 with which cooperates a belt 15.

Arranged between the table legs 11 is a foot pedal 16 which is fulcrumed at 17, said foot pedal 16 having a vertically extending arm 18 formed integral therewith and extending upwardly through the table 10 to engage the twister, as will be hereinafter described. The parts 16 and 18 form, as will be seen, a bell crank lever.

The twisting mechanism comprises a base 20 having a plurality of holes 21 therein through which fastening screws pass to secure the twister to the table 10. Formed integral with said base 20 and extending upwardly therefrom are bearings 22 and 23, both of which have threaded therein grease cups 24.

Transversely mounted in the bearings 22 and 23 is a tubular shaft 25 which has a head portion 26 at its front end formed integral therewith, the periphery of said head being threaded, as shown at 27, in Fig. 2. The rearward end of said shaft 25 extends a slight distance beyond the bearing 22. The bearings 22 and 23 are spaced apart and disposed between them is a channeled pulley 28 with which the driving belt 15 cooperates, said belt 15 passing through openings in the base 20 and the table 10 so as not to interfere with the operation of the belt. This pulley 28 is secured to the tubular shaft 25 by means of a set screw 29 arranged in an opening 30 provided therefor in said pulley and engaging at its inner end against said shaft. Said pulley and tubular shaft, therefore, rotate together.

Mounted in the tubular shaft 25 for free relative rotary and longitudinal movement therein is a shaft 31, said shaft 31 having a spring retaining collar 32 secured to the rearward end thereof by a set screw 32'. A helical compression spring 33 is coiled around said shaft 31 and is interposed between the collar 32 and the adjacent end of the tubular shaft 25.

The shaft 31 has a clamping head member 34 provided on the front end thereof. The outer face of this head 34 is bevelled at 35 for purposes as will be presently described. The head 34 is normally held against the adjacent end of shaft 25 by the tension of the spring 33. The tension of this spring may be varied by adjusting the collar 32 to the desired position on the shaft 31, this being accomplished by loosening the screw 32'.

Threaded upon the head 26 of the tubular shaft 25 is a hollow cup-shaped member 36. This cup-shaped member is provided in its outer end with a centrally positioned opening 37, said opening being in axial alignment with the shaft 31. Said cup 36 is also cut away as shown at 38 at two places which affords ready access to the interior thereof and facilitates cleaning of the parts. The inner surface of the outer end or wall of member 36 surrounding the opening 37 is bevelled at 39. The arrangement is such that the bevelled faces 35 and 39 are parallel, so that a positive clamping action will be obtained upon forward movement of shaft 31 carrying the face 35 of the clamping head 34 into engagement with the face 39 of the member 36.

The rearward end of the shaft 31 is drilled to receive the upper end of the vertically extending arm 18 which is pointed as shown at 40 for this purpose, the arrangement being such that said shaft may be moved forward through depression of the foot pedal 16.

The operation of this twister is as follows: The line shaft 13 is operated from any suitable source and the power is transmitted therefrom to the channel pulley 28 through the medium of the belt 15. The line shaft is in continual rotation. The tubular shaft 25, the head 26 and the cup-shaped member 36 will also rotate continuously as said tubular shaft is secured to the pulley 28.

In the twisting operation the operator takes the article "A" desired to be twisted and inserts one end thereof into the opening 37 in the cup-shaped member 36, holding the other end in his hand. He will then press downwardly on the foot pedal 16 which will, through the arm 18, move the shaft 31 against the tension of the spring 33 to the dotted line position shown in Fig. 2 whereby the inserted end of the article to be twisted will be securely clamped between said bevelled faces 35 and 39 effecting twisting of the article as the parts rotate.

The foot is kept on the lever 16 until the desired twist to the article is obtained whereupon the foot is removed and the spring bearing against the collar 32 will move the shaft 31 to its normal position and the twisted article will then be released so as to permit of removal.

The bevelling of the respective parts is advantageous when inserting the article to be twisted as this bevelling facilitates insertion of the end of the article and renders it possible to insert the article from any angle. There are no obstructions with which the articles might meet during insertion and the speed with which the operator might work is therefore practically unlimited.

Having thus described my invention, what I claim as new and desire to secure by Letters Patent is:

1. A twister of the class described comprising a pair of cooperating co-axially arranged clamping members, said members having opposing engaging surfaces, pivotally mounted manually operated means for moving said members axially relatively to each other, and means for rotating said members.

2. A twister of the class described comprising a pair of cooperating rotating clamping members telescopically mounted, and pivotally mounted means abutting one end of one of said members adapted, when actuated, to impart axial movement to said clamping member.

3. A twister of the class described comprising a pair of cooperating rotating clamping members telescopically mounted, and means for continuously rotating the outer of said telescoping members.

4. A twister of the class described comprising a pair of cooperating rotating clamping members telescopically mounted, means for continuously rotating the outer of said telescoping members, and means for axially moving the inner of said members within said continuously rotating outer member.

5. A twister of the class described comprising a pair of cooperating rotating clamping members telescopically mounted, means for continuously rotating the outer of said telescoping members, and means for axially moving the inner of said members within said continuously rotating outer member to bring said members into clamping engagement with each other.

6. A twister of the class described comprising a pair of cooperating rotating clamping members, said members having engaging surfaces movable toward and from each other, and manually operated means for moving said surfaces toward each other.

7. A twister of the class described comprising a pair of cooperating rotating clamping members, said members having engaging surfaces movable toward and from each other, manually operated means for moving said surfaces toward each other, and a spring for moving said surfaces from each other.

8. A twister of the class described comprising a base member, a pair of cooperating clamping members rotatable and telescopically mounted in said base, and a cup-shaped member rotatable with the outer of said telescoping members, and having an aperture therein for insertion of the article to be twisted.

9. A twister of the class described comprising a base member, a pair of cooperating clamping members rotatably and telescopically mounted in said base, a cup-shaped member rotatable with the outer of said telescoping members, and having an aperture therein for insertion of the article to be twisted, and a means for moving one of said clamping members axially with respect to the other clamping member.

10. A twister of the class described comprising a base member, a pair of cooperating clamping members rotatably and telescopically mounted in said base, a cup-shaped member rotatable with the outer of said telescoping members and having an aperture therein for insertion of the article to be twisted, a spring for axially moving one of said clamping members in one direction, and means for adjusting the tension of said spring.

11. A twister of the class described comprising a pair of cooperating rotating clamping members telescopically mounted, means for continuously rotating the outer of said telescoping members, and means abutting one end of the inner one of said members for axially moving the same within said outer member.

In witness whereof, I have hereunto subscribed my name.

WALTER E. OLSON.

Witnesses:
A. A. WALLEY,
ELSIE COHEN.